No. 693,024. Patented Feb. 11, 1902.
O. IVERSEN.
HOSE COUPLING CLAMP.
(Application filed Apr. 19, 1901.)
(No Model.)
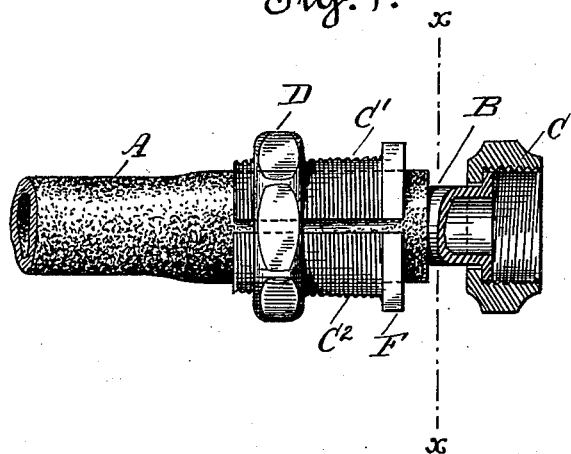
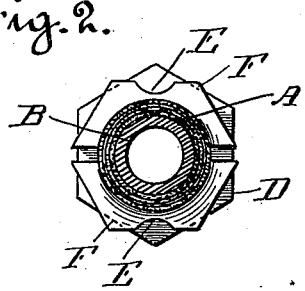
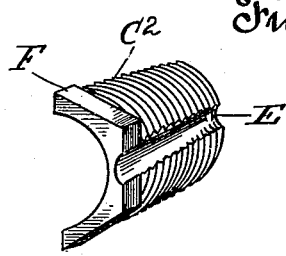
Witnesses.
Inventor.
Ole Iversen
by Spear & Seely
Attorneys

UNITED STATES PATENT OFFICE.

OLE IVERSEN, OF EAST BERKELEY, CALIFORNIA.

HOSE-COUPLING CLAMP.

SPECIFICATION forming part of Letters Patent No. 693,024, dated February 11, 1902.

Application filed April 19, 1901. Serial No. 56,614. (No model.)

*To all whom it may concern:*

Be it known that I, OLE IVERSEN, a citizen of the United States, residing at East Berkeley, in the county of Alameda and State of California, have invented certain new and useful Improvements in Hose-Coupling Clamps, of which the following is a specification.

My invention relates to clamps for hose-joints; and my object is to provide a cheap and simple device easily and quickly applicable and which is capable of being clamped concentrically upon the hose and the tubular rod inclosed thereby.

The ordinary clamp comprises a ring cut through at one point and provided with lugs to receive a transverse tightening-screw. The tightening action of this screw only partly compresses the ring around the hose, there being a considerable arc opposite the screw, which is really expanded away from the joint, so that the pressure is never concentric and complete. This difficulty is obviated by the clamp herein described and shown in the accompanying drawings.

Figure 1 is a side elevation of the end of a section of hose and the parts which form a joint with another section. Fig. 2 is a cross-section on line $x\ x$ of Fig. 1. Fig. 3 is a perspective view of a member of the clamp.

The drawings illustrate the end of a section of hose A, forced upon the usual hollow rod B, upon the end of which is (in this case) swiveled the female member C of the coupling, which is completed by a coöperating male member on the end of the rod in the next section of hose. (Not shown.) My clamp is for the purpose of firmly securing the hose upon the rod B. It comprises two or more members C' C², two being sufficient in the case of small hose, but three or more being desirable with larger sizes. These members are internally cylindrical to fit the hose, but are externally tapered and threaded to receive the clamping-nut D, which is fitted upon their smaller ends and then turned up, compressing the sections conjointly, firmly, and equally upon the hose, so that a complete and effective clamping action is assured.

In some cases, and particularly should only two clamp members be used with a rather large hose, I prefer to weaken such members at about their middle longitudinal line. The preferred construction is a groove E, extending from end to end and causing an immaterial mutilation in the thread. These grooves allow the clamp-sections to give or yield slightly under the clamping strain and permit the clamp to more easily conform to the hose. The clamp members are preferably finished with a polygonal strengthening-flange F.

It is evident that the assembling and securing of these clamping members is accomplished with great facility and requires no special care. Even when carelessly done, so that the members are not in line or do not coincide, the nut will always engage the threads of both before it is fully turned up and the clamp will be secure.

What I claim is—

1. In combination with a tubular rod to fit within the hose, a clamp adapted to fit upon the hose placed upon said tube, said clamp comprising externally-threaded sections which are disconnected from each other and also from the tube and are adjustable independently of each other and also of the said tube to occupy different positions longitudinally of said tube and a nut for compressing the sections onto the hose, substantially as described.

2. In combination, the tube B adapted to fit within the hose, a female member swiveled on the said tube B, a clamp composed of sections disconnected from each other and from the tube B and a nut for holding the clamping-sections, said clamping-sections being arranged about the smooth part of the tube B back of the swivel, substantially as described.

3. A hose-coupling clamp comprising a plurality of threaded and tapered members, adapted to be assembled so as to conjointly surround a hose, a superficial groove for weakening each member longitudinally, and a nut adapted to engage the threads of said members.

In testimony whereof I have affixed my signature, in presence of two witnesses, this 6th day of April, 1901.

OLE IVERSEN.

Witnesses:
S. W. SEELY,
F. E. MONTEVERDE.